(12) United States Patent
Suzuki

(10) Patent No.: US 8,785,045 B2
(45) Date of Patent: Jul. 22, 2014

(54) ACTIVE MATERIAL, ELECTRODE, BATTERY, AND METHOD OF MANUFACTURING ACTIVE MATERIAL

(75) Inventor: Tadashi Suzuki, Tokyo (JP)

(73) Assignee: TDK Corporation, Tokyo (JP)

( * ) Notice: Subject to any disclaimer, the term of this patent is extended or adjusted under 35 U.S.C. 154(b) by 1454 days.

(21) Appl. No.: 12/108,244

(22) Filed: Apr. 23, 2008

(65) Prior Publication Data

US 2008/0268339 A1    Oct. 30, 2008

(30) Foreign Application Priority Data

Apr. 27, 2007   (JP) .............................. P2007-119778

(51) Int. Cl.
*H01M 4/13*  (2010.01)

(52) U.S. Cl.
USPC ................. 429/231.1; 429/231.2; 429/231.5; 429/231.6; 429/233; 429/223; 427/58; 252/182.1; 252/519.5; 252/520.2; 252/520.4; 252/521.2; 252/521.5; 252/518.1; 252/500

(58) Field of Classification Search
USPC .......... 429/231.3, 231.1, 231.2, 231.5, 231.6, 429/233, 223; 427/58; 252/182.1, 519.5, 252/520.2, 520.4, 521.2, 521.5, 518.1, 500
See application file for complete search history.

(56) References Cited

U.S. PATENT DOCUMENTS

| | | | |
|---|---|---|---|
| 6,746,799 B2 | 6/2004 | Yamada et al. | |
| 7,041,239 B2 * | 5/2006 | Barker et al. ............. | 252/521.5 |
| 2002/0004169 A1 | 1/2002 | Yamada et al. | |
| 2004/0096743 A1 | 5/2004 | Okae et al. | |
| 2005/0196674 A1 | 9/2005 | Chiga et al. | |

FOREIGN PATENT DOCUMENTS

| | | |
|---|---|---|
| CN | 1495945 A | 5/2004 |
| JP | A 2001-307730 | 11/2001 |
| JP | A 2002-75368 | 3/2002 |
| JP | A 2002-198050 | 7/2002 |
| JP | A 2004-87299 | 3/2004 |
| JP | A 2004-303527 | 10/2004 |
| JP | A-2007-103339 | 4/2007 |

OTHER PUBLICATIONS

J. Barker et al., "Electrochemical Properties of Beta-LiVOPO$_4$ Prepared by Carbothermal Reduction," Journal of the Electrochemical Society, vol. 151, No. 6, pp. A796-A800, 2004.

* cited by examiner

*Primary Examiner* — Laura Weiner
(74) *Attorney, Agent, or Firm* — Oliff PLC

(57) ABSTRACT

An active material comprises a core particle containing LiCo$_{(1-x)}$M$_x$O$_2$ and/or Li(Mn$_{(1-y)}$M$_y$)$_2$O$_4$, and a coating part covering at least part of a surface of the core particle, while the coating part contains LiVOPO$_4$. Here, M is at least one element selected from the group consisting of Al, Mg, and transition elements, $0.95 \geq x \geq 0$, $0.2 \geq y \geq 0$, and V in LiVOPO$_4$ may partly be substituted by at least one element selected from the group consisting of Ti, Ni, Co, Mn, Fe, Zr, Cu, Zn, and Yb.

7 Claims, 3 Drawing Sheets

ACTIVE MATERIAL, ELECTRODE, BATTERY, AND METHOD OF MANUFACTURING ACTIVE MATERIAL

BACKGROUND OF THE INVENTION

1. Field of the Invention

The present invention relates to an active material, an electrode, a battery, and a method of manufacturing the active material.

2. Related Background Art $LiNiMnCoO_2$, $LiMn_2O_4$, $LiFePO_4$, and $LiVOPO_4$ have been known as positive electrode active materials for lithium ion secondary batteries (see, for example, Japanese Patent Application Laid-Open Nos. 2002-198050, 2001-307730, 2002-75368, 2004-87299, and 2004-303527, J. Electrochem. Soc., Vol. 151, Issue 6, p. A796 (2004), and the like).

SUMMARY OF THE INVENTION $LiCo_{(1-x)}M_xO_2$ such as $LiNiMnCoO_2$ is an oxide having a layer-like structure. Though it can achieve a high capacity (e.g., about 150 mAh/g or higher) and has a high discharge voltage of about 3.8 V vs. lithium, its thermal stability is not sufficient in a highly charged state in particular, since oxygen atoms in its crystal structure are likely to react with electrolytes so as to be released from the crystal.

$Li(Mn_{(1-y)}M_y)_2O_4$ such as $LiMn_2O_4$ is an oxide having a spinel structure. Though it has a high theoretical capacity of about 148 mAh/g and a high discharge voltage of about 3.9 V vs. lithium, $Mn^{3+}$ ions tend to dissolve in electrolytes in a high-temperature state (e.g., 45° C. or higher), so that the negative electrode on which these ions are deposited is likely to deteriorate, whereby its stability in the high-temperature state is insufficient.

On the other hand, an active material in which $LiNiCoO_2$ is coated with $LiFePO_4$ and an active material in which $LiNiO_2$ is coated with $LiFePO_4$ have been known. Though $LiFePO_4$ which is excellent in high-temperature stability has a relatively high theoretical capacity, it exhibits a low discharge voltage of about 3.4 V vs. lithium. $LiMnPO_4$ has a conductivity lower than that of $LiVOPO_4$ which will be explained later. Therefore, an active material coated with any of them decreases its discharge energy as a whole.

In view of the problem mentioned above, it is an object of the present invention to provide an active material excellent in stability at a high temperature and in discharge energy, a battery using the same, and a method of manufacturing the active material.

The inventors have focused attention on $LiVOPO_4$. It has a high structural stability at a high temperature, a high theoretical capacity of 159 mAh/g, and a high discharge voltage of 3.8 to 3.9 V vs. lithium. Also, it has a sufficiently high conductivity and thus can attain a sufficiently high effective capacity. Further, the atmosphere at the time of its synthesis is not required to be controlled so strictly.

The active material in accordance with the present invention comprises a core particle containing $LiCo_{(1-x)}M_xO_2$ and/or $Li(Mn_{(1-y)}M_y)_2O_4$ and a coating part covering at least part of a surface of the core particle, while the coating part contains $LiVOPO_4$.

Here, M is at least one element selected from the group consisting of Al, Mg, and transition elements, $0.95 \geq x \geq 0$, $0.2 \geq y \geq 0$, and V in $LiVOPO_4$ may partly be substituted by at least one element selected from the group consisting of Ti, Ni, Co, Mn, Fe, Zr, Cu, Zn, and Yb.

In the present invention, the surface of $LiCo_{(1-x)}M_xO_2$ having a layer-like structure which is likely to come into contact with and react with an electrolyte at a high temperature and/or the surface of $Li(Mn_{(1-y)}M_y)_2O_4$ from which $Mn^{3+}$ ions are likely to be eluted into the electrolyte at the high temperature is covered with the coating part containing $LiVOPO_4$ which is excellent in structural stability at the high temperature, whereby the core particle and the electrolyte can be restrained from coming into direct contact with each other. This can suppress the release of oxygen and elution of $Mn^{3+}$ from the crystal structure, thereby stabilizing the crystal structure at the high temperature.

$LiVOPO_4$ is easy to insert and release Li ions, functions as an active material, and has not only a sufficiently high theoretical capacity but also a sufficiently high discharge voltage of 3.8 to 3.9 V vs. lithium. Its crystal structure is stable even at the high temperature and deteriorates less even when in contact with the electrolyte.

Preferably, the coating part has a thickness of 50 nm to 1 μm.

$LiVOPO_4$ has an electron conductivity somewhat lower than that of the core particle. Therefore, making its thickness 1 μm or less can sufficiently restrain characteristics (such as impedance) from being worsened by the lowness in electron conductivity. The thickness of 50 nm or greater can fully prevent the electrolyte and the core particle from coming into direct contact with each other.

The lithium ion secondary battery in accordance with the present invention is a lithium ion secondary battery containing the above-mentioned active material.

The method of manufacturing an active material in accordance with the present invention includes a supporting step of causing at least part of a surface of a core particle containing $LiCo_{(1-x)}M_xO_2$ and/or $Li(Mn_{(1-y)}M_y)_2O_4$ to support $LiVOPO_4$. This can easily manufacture the above-mentioned active material.

Preferably, the supporting step mixes the core particle and an $LiVOPO_4$ particle in a fluidized bed.

This can easily cover at least part of the surface of the core particle with $LiVOPO_4$.

The supporting step may mix a solution containing a precursor of $LiVOPO_4$ and the core particle and then synthesize $LiVOPO_4$ in the solution.

This can also easily cover at least part of the surface of the core particle with $LiVOPO_4$.

The present invention provides an active material excellent in stability at a high temperature and in discharge energy, a battery using the same, and a method of manufacturing the active material.

EXPLANATIONS OF NUMERALS

1 ... core particle, 2 ... coating part; 5 ... active material; 10 ... positive electrode (electrode); 12 ... positive electrode current collector; 14 ... positive electrode active material layer (active material layer); 100 ... lithium ion secondary battery

DESCRIPTION OF THE PREFERRED EMBODIMENTS

In the following, preferred embodiments of the present invention will be explained in detail with reference to the accompanying drawings. In the explanation of the drawings, constituents identical or equivalent to each other will be referred to with the same numerals while omitting their overlapping descriptions. Ratios of dimensions in each drawing do not always coincide with those in practice.

Active Material 5

Figure 1:
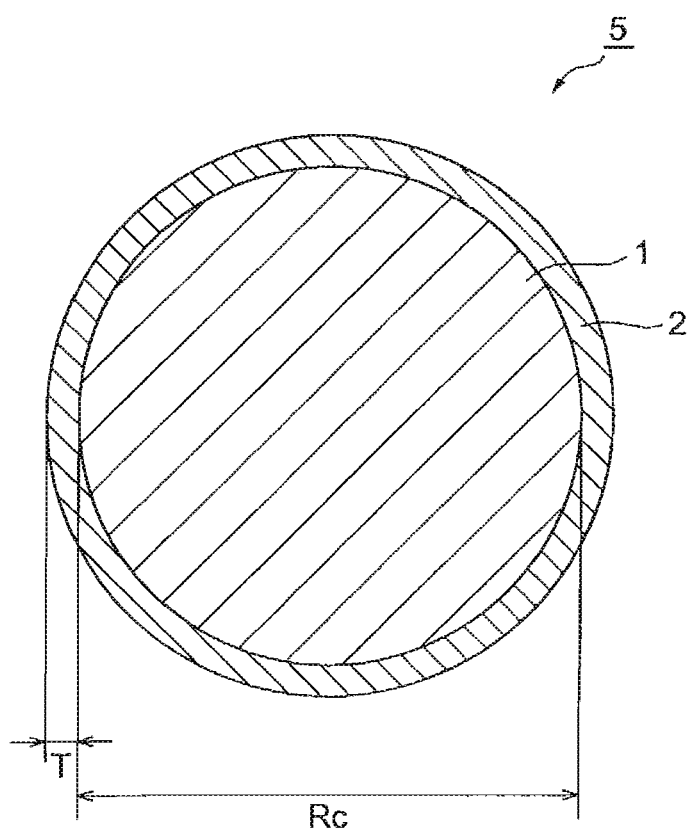
FIG. 1 is a schematic sectional view of an active material in accordance with an embodiment.
Figure 2:
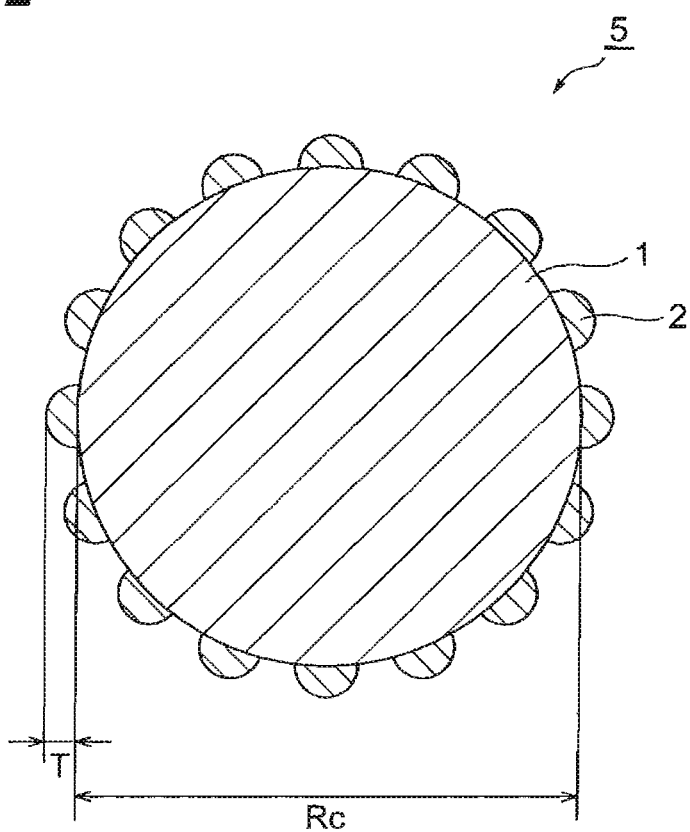
FIG. 2 is a schematic sectional view of another active material in accordance with the embodiment.

An active material 5 in accordance with the present invention will now be explained. As shown in FIGS. 1 and 2, the active material 5 in accordance with the present invention comprises a core particle 1 and a coating part 2 covering at least part of the surface of the core particle 1.

The core particle 1 contains $LiCo_{(1-x)}M_xO_2$ and/or $Li(Mn_{(1-y)}M_y)_2O_4$. Here, M is at least one element selected from the group consisting of Al, Mg, and transition elements, $0.95 \geq x \geq 0$, and $0.2 \geq y \geq 0$. Preferred in particular among the transition elements are Ti, Cr, Mn, Fe, Co, Ni, Cu, and Zn.

Particularly preferred examples of $LiCo_{(1-x)}M_xO_2$ include $LiCoO_2$, $LiCo_{1-x}Ni_{x1}Mn_{x2}O_2$, and $LiCo_{1-x}Ni_{x1}Al_{x2}O_2$. Here, $x1+x2=x$.

Particularly preferred examples of $Li(Mn_{(1-y)}M_y)_2O_4$ include $LiMn_2O_4$ and $Li(Mn_{(1-x)}Al_x)_2O_4$.

Preferably, the core particle 1 is mainly composed of $LiCo_{(1-x)}M_xO_2$ and/or $Li(Mn_{(1-y)}M_y)_2O_4$, i.e., $LiCo_{(1-x)}M_xO_2$ and/or $Li(Mn_{(1-y)}M_y)_2O_4$ occupies the largest weight fraction, 90 wt % or more in particular, in all the ingredients of the core particle.

The coating part 2 contains $LiVOPO_4$. V in $LiVOPO_4$ may partly be substituted by at least one element selected from the group consisting of Ti, Ni, Co, Mn, Fe, Zr, Cu, Zn, and Yb. The ratio of substitution is preferably 5 atom % or less.

Preferably, the coating part 2 is mainly composed of $LiVOPO_4$, i.e., $LiVOPO_4$ occupies the largest weight fraction, 90 wt % or more in particular, in all the ingredients of the coating part. Preferably, $LiVOPO_4$ is orthorhombic.

The coating part 2 may cover the whole surface of the core particle 1 as shown in FIG. 1 or part thereof as shown in FIG. 2. The surface coverage is preferably 50% or more.

Though not restricted in particular, the thickness T of the coating part 2 is preferably 1 μm or less, since the electron conductivity of $LiVOPO_4$ is lower than that of the core particle. From the viewpoint of fully restraining an electrolyte and the core particle 1 from coming into direct contact with each other, on the other hand, the thickness T is preferably 50 nm or more.

The ratio (T/Rc) of the thickness T of the coating part 2 to the particle size Rc of the core particle 1 is preferably 1/100 to 1/10.

Though not restricted in particular, the particle size of the active material 5 is preferably on the order of 0.5 to 15 μm. Though not restricted in particular, the particle size of $LiVOPO_4$ particles contained in the coating part 2 is preferably on the order of 10 nm to 500 nm from the viewpoint of favorable conductivity. The coating part 2 may contain particles made of carbonaceous matters from the viewpoint of securing a sufficient conductivity.

Operation Effect

In such an active material, the surface of $LiCo_{(1-x)}M_xO_2$ having a layer-like structure which is likely to come into contact with and react with an electrolyte at a high temperature and/or the surface of $Li(Mn_{(1-y)}M_y)_2O_4$ from which $Mn^{3+}$ ions are likely to be eluted into the electrolyte at the high temperature is covered with the coating part 2 containing $LiVOPO_4$ which is excellent in structural stability at the high temperature, whereby the core particle 1 and the electrolyte can be restrained from coming into direct contact with each other. This can suppress the release of oxygen and elution of $Mn^{3+}$ from the crystal structure of the core particle 1, thereby stabilizing the crystal structure of the core particle 1 at the high temperature.

$LiVOPO_4$ is easy to insert and release Li ions, functions as an active material, and has not only a sufficiently high theoretical capacity but also a sufficiently high discharge voltage of 3.8 to 3.9 V vs. lithium. Further, its crystal structure is stable even at the high temperature and deteriorates less even when in contact with the electrolyte. Therefore, a lithium ion secondary battery which is highly stable at the high temperature while having a sufficient discharge energy per volume and weight can be provided. Also, the actual capacity can fully be secured, since the conductivity is sufficient.

Methods of Manufacturing Active Material 5

Methods of manufacturing the active material 5 will now be explained.

First Manufacturing Method

First, particles containing $LiCo_{(1-x)}M_xO_2$ and/or $Li(Mn_{(1-y)}M_y)_2O_4$ to become the core particle 1 are prepared. These particles can be manufactured by a known method. A preferred particle size is 0.5 to 15 μm.

On the other hand, $LiVOPO_4$ particles to become the coating part 2 are prepared. The $LiVOPO_4$ particles can be manufactured by the following method, for example.

For example, a precursor aqueous solution containing Li, V, and P sources at a molar ratio of Li:V:P=about 1:1:1 is stirred while heating them, dried, and then fired. As mentioned above, V may partly be substituted by at least one element selected from the group consisting of Ti, Ni, Co, Mn, Fe, Zr, Cu, Zn, and Yb. In this case, a substituent element source is added.

Examples of the Li source include lithium hydroxide, lithium nitrate, lithium carbonate, and lithium acetate. Examples of the V source include vanadium dioxide, vanadium trioxide, vanadium pentoxide, and ammonium vanadate. Examples of the P source include ammonium phosphate, ammonium dihydrogen phosphate, ammonium phosphate dibasic, phosphoric acid, and phosphoric anhydride.

The firing is preferably performed in an oxygen-containing atmosphere such as air at a firing temperature of preferably 500° C. or higher but 670° C. or lower, more preferably 650° C. or lower, for 10 hr or more but 100 hr or less, more preferably 50 hr or less.

After the firing, if necessary, the particle size is adjusted by a known apparatus such as ball mill, satellite ball mill, roller mill, atomizer, pin disc mill, or jet mill.

Subsequently, the $LiCo_{(1-x)}M_xO_2$ and/or $Li(Mn_{(1-y)}M_y)_2O_4$ particles and the $LiVOPO_4$ particles are caused to collide against each other, so that $LiVOPO_4$ is supported on the $LiCo_{(1-x)}M_xO_2$ and/or $Li(Mn_{(1-y)}M_y)_2O_4$ particles. Examples of the colliding method include one mixing the $LiCo_{(1-x)}M_xO_2$ and/or $Li(Mn_{(1-y)}M_y)_2O_4$ particles with the $LiVOPO_4$ particles in a ball mill and one putting the $LiCo_{(1-x)}M_xO_2$ and/or $Li(Mn_{(1-y)}M_y)_2O_4$ particles and the $LiVOPO_4$ particles into a fluidized bed fluidizing at a high speed.

Second Manufacturing Method

The second manufacturing method mixes the $LiCo_{(1-x)}M_xO_2$ and/or $Li(Mn_{(1-y)}M_y)_2O_4$ particles into the above-mentioned precursor aqueous solution used for manufacturing $LiVOPO_4$, synthesizes $LiVOPO_4$ in the solution by heating thereafter, and then performs drying and firing. In this case, the firing is preferably performed in an oxygen-containing atmosphere such as air so as not to generate oxygen vacancies in the $LiCo_{(1-x)}M_xO_2$ and/or $Li(Mn_{(1-y)}M_y)_2O_4$ particles. It is difficult for this manufacturing method to use other kinds of $LiMPO_4$ (where M is Fe, Co, Ni, Mn, or the like) for which a reducing atmosphere is a preferred firing atmosphere, such as $LiFePO_4$ in particular.

Lithium Ion Secondary Battery

Figure 3:
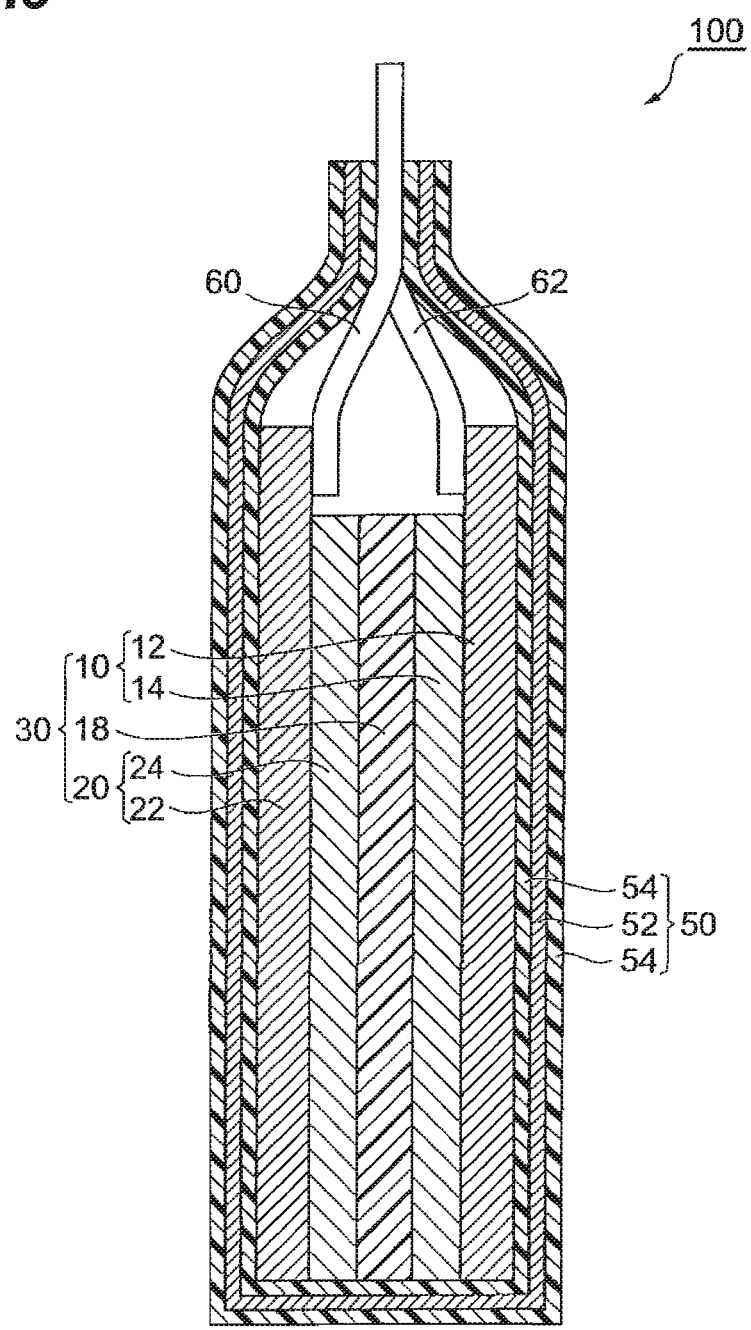
FIG. 3 is a schematic sectional view of the lithium ion secondary battery in accordance with an embodiment.

The electrode and lithium ion secondary battery in accordance with the present invention will now be explained in brief with reference to FIG. 3.

The lithium ion secondary battery 100 mainly comprises a multilayer body 30, a case 50 accommodating the multilayer body 30 in a sealed state, and a pair of leads 60, 62 connected to the multilayer body 30.

The multilayer body 30 is one in which a pair of electrodes 10, 20 are arranged so as to oppose each other while holding a separator 18 therebetween. The positive electrode 10 is one in which a positive electrode active material layer 14 is provided on a positive electrode current collector 12. The negative electrode 20 is one in which a negative electrode active material layer 24 is provided on a negative electrode current collector 22. The positive electrode active material layer 14 and negative electrode active material layer 24 are in contact with both sides of the separator 18, respectively. The leads 60, 62 are connected to respective end parts of the negative electrode current collector 22 and positive electrode current collector 12, while having end parts extending to the outside of the case 50.

As the positive electrode current collector 12, an aluminum foil can be used, for example. The positive electrode active material layer 14 is a layer containing the above-mentioned active material 5, a binder, and a conductive agent which is compounded when necessary.

The binder is not restricted in particular as long as it can bind the above-mentioned active material and conductive agent to the current collector, whereby known binding agents can be used. Examples of the binder include fluorine resins such as polyvinylidene fluoride (PVDF), polytetrafluoroethylene (PTFE), and vinylidene fluoride/hexafluoropropylene copolymer.

Examples of the conductive agent include carbon blacks, carbon materials, and conductive oxides such as ITO.

Such a positive electrode can be manufactured by a known method, for example, by preparing a slurry in which the above-mentioned active material 5, binder, and conductive agent are added to a solvent corresponding to the binder, e.g., N-methyl-2-pyrrolidone, N,N-dimethylformamide, or the like in the case of PVDF, applying the slurry to the surface of the positive electrode current collector 12, and then drying it.

A copper foil or the like can be used as the negative electrode current collector 22. As the negative electrode active material layer 24, one containing a negative electrode active material, a conductive agent, and a binder can be used. The conductive agent used when necessary is not limited in particular, whereby known conductive agents can be used. Examples of the conductive agent include carbon blacks; carbon materials; powders of metals such as copper, nickel, stainless, and iron; mixtures of carbon materials and metal powders; and conductive oxides such as ITO. As the binder used in the negative electrode, known binding agents can be used without any restrictions in particular. Examples of the binder include fluorine resins such as polyvinylidene fluoride (PVDF), polytetrafluoroethylene (PTFE), tetrafluoroethylene/hexafluoropropylene copolymer (FEP), tetrafluoroethylene/perfluoroalkylvinylether copolymer (PFA), ethylene/tetrafluoroethylene copolymer (ETFE), polychlorotrifluoroethylene (PCTFE), ethylene/chlorotrifluoroethylene copolymer (ECTFE), and polyvinyl fluoride (PVF). The binder not only binds constituent materials of the active material particle, the conductive agent added when necessary, and the like to each other, but also contributes to binding the constituent materials and the current collector to each other. Examples of the binder also include polyethylene, polypropylene, polyethylene terephthalate, aromatic polyamides, cellulose, styrene/butadiene rubber, isoprene rubber, butadiene rubber, and ethylene/propylene rubber in addition to those mentioned above. Thermoplastic elastomeric polymers such as styrene/butadiene/styrene block copolymer, its hydrogen adducts, styrene/ethylene/butadiene/styrene copolymer, styrene/isoprene/styrene block copolymer, and its hydrogen adducts may also be used. Further, syndiotactic 1,2-polybutadiene, ethylene/vinyl acetate copolymer, propylene/α-olefin (having a carbon number of 2 to 12) copolymer, and the like may be used. Conductive polymers may be used as well.

Examples of the negative electrode active material include particles containing carbon materials which can occlude/release lithium, ions (by intercalating/deintercalating or doping/undoping), such as graphite, carbon which is hard to graphitize, carbon which is easy to graphitize, and carbon fired at a low temperature; metals adapted to combine with lithium, such as Al, Si, and Sn; amorphous compounds mainly composed of oxides, such as $SiO_2$ and $SnO_2$; and lithium titanate ($Li_4Ti_5O_{12}$).

The negative electrode 20 may be manufactured by preparing a slurry and applying it to the current collector as in the method of manufacturing the positive electrode 10.

The electrolyte solution is one contained within the positive electrode active material layer 14, negative electrode active material layer 24, and separator 18. The electrolyte solution is not restricted in particular, whereby electrolyte solutions (aqueous electrolyte solutions and electrolyte solutions using organic solvents) containing lithium salts can be used in this embodiment, for example. However, the electrolyte solutions using organic solvents (nonaqueous electrolyte solutions) are preferred, since the aqueous electrolyte solutions electrochemically have a low decomposition voltage which limits their withstand voltage. Preferably used as the electrolyte solution is one in which a lithium salt is dissolved in a nonaqueous solvent (organic solvent). Examples of the lithium salt include $LiPF_6$, $LiClO_4$, $LiBF_4$, $LiAsF_6$, $LiCF_3SO_3$, $LiCF_3CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. These salts may be used either singly or in combinations of two or more.

Preferred examples of the organic solvent include propylene carbonate, ethylene carbonate, diethyl carbonate, dimethyl carbonate, and methylethyl carbonate. They may be used either singly or in combinations of two or more.

In this embodiment, the electrolyte solution is not limited to a liquid, but may be a gelled electrolyte obtained by adding a gelling agent thereto. Instead of the electrolyte solution, a solid electrolyte (electrolyte made of a solid polymer electrolyte or ionically conductive inorganic material) may be contained as well.

The separator 18 is formed from an electrically insulating porous body. Its examples include a single or multilayer film made of polyethylene, polypropylene, or polyolefin; extended films of mixtures of the resins mentioned above; and fibrous nonwoven fabrics made of at least one kind of constituent material selected from the group consisting of cellulose, polyester, and polypropylene.

The case 50 is one sealing the multilayer body 30 and electrolyte therewithin. The case 50 is not restricted in particular as long as it can keep the electrolyte from leaking out and inhibit the moisture and the like from entering the inside of the lithium ion secondary battery 100 from the outside. For example, a metal laminate film in which a metal foil 52 is coated with polymer films 54 from both sides as shown in FIG. 1 can be utilized as the case 50. An aluminum foil can be used as the metal foil 5, while films such as polypropylene can be used as the synthetic resin films 54, for example. Preferred examples of the material for the outer polymer film 54 include polymers having a high melting point such as polyethylene terephthalate (PET) and polyamides. Preferred examples of the material for the inner polymer film 54 include polyethylene and polypropylene.

The leads 60, 62 are formed from a conductive material such as aluminum.

EXAMPLES

Example 1

First, $LiCoO_2$ particles having an average particle size of about 10 μm and $LiVOPO_4$ particles having an average particle size of about 0.5 μm were prepared. With respect to a particle layer in which these particles were mixed, a gas-phase fluidized bed rotationally fluidizing at a high speed was formed, so as to cause the particles to collide against each other, thereby forming a coating part made of $LiVOPO_4$ on each core particle made of $LiCoO_2$. Thus, an active material was manufactured. The thickness of the coating part was about 200 nm, while its coverage was about 80%.

A slurry was made by mixing the above-mentioned active material (93 wt %), PVDF (3 wt %) as a binder, and carbon black (4 wt %) as a conductive agent in to N,N-dimethylformamide. The slurry was applied to an aluminum foil (having a thickness of 20 μm) employed as a positive electrode current collector, dried, and then pressed with a roll, so as to manufacture a positive electrode.

Example 2

An active material and an electrode were manufactured as in Example 1 except that $LiMn_2O_4$ particles having an average particle size of about 10 μm and $LiVOPO_4$ particles having an average particle size of about 0.5 μm were used as raw materials for the active material.

Comparative Example 1

An active material and an electrode were manufactured as in Example 1 except that only $LiCoO_2$ particles having an average particle size of about 10 μm were used as the raw material for the active material and that no coating part was formed.

Comparative Example 2

An active material and an electrode were manufactured as in Example 1 except that only $LiMn_2O_4$ particles having an average particle size of about 10 μm were used as the raw material for the active material and that no coating part was formed.

Comparative Example 3

An active material and an electrode were manufactured as in Example 1 except that $LiCoO_2$ particles having an average particle size of about 10 μm and $LiFePO_4$ particles having an average particle size of about 0.5 μm were used as raw materials for the active material.

Comparative Example 4

An active material and an electrode were manufactured as in Example 1 except that $LiCoO_2$ particles having an average particle size of about 10 μm and $LiMnPO_4$ particles having an average particle size of about 0.5 μm were used as raw materials for the active material.

Measurement of Battery Characteristics

Using metallic lithium as a negative electrode (reference electrode) and a 1 mol/L $LiPF_6$ solution (whose solvent contained ethylene carbonate and diethyl carbonate at a volume ratio of 30:70 as an electrolyte), respective cells including the positive electrodes of the foregoing examples and comparative examples were constructed. After being charged to 4.5 V vs. lithium, each cell was disassembled. An appropriate amount of the positive electrode active material layer was collected from the disassembled cell and encapsulated into a metal container. Thereafter, its heating behavior in the coexistence with the electrolyte was analyzed by differential scanning calorimetry. The calorific value was represented relative to that of Comparative Example 1 taken as 100.

At 55° C., 300 cycles of charging and discharging at a rate of 1 C were performed, so as to determine a capacity maintenance ratio (discharge capacity after 300 cycles/initial discharge capacity).

TABLE 1

| | Active material | Heating Start temp. | Calorific value | Discharge capacity (mAh/g) | Discharge Voltage (V) |
|---|---|---|---|---|---|
| Example 1 | $LiCoO_2$/$LiVOPO_4$ | 243° C. | 58 | 150 | 3.9 |
| Comparative Example 1 | $LiCoO_2$ | 180° C. | 100 | 153 | 3.9 |
| Comparative Example 3 | $LiCoO_2$/$LiFePO_4$ | 258° C. | 59 | 150 | 3.75 |
| Comparative Example 4 | $LiCoO_2$/$LiMnPO_4$ | 250° C. | 55 | 125 | 3.9 |

TABLE 2

| | Active material | Heating Start temp. | Calorific value | Discharge capacity (mAh/g) | Capacity Maintenance Ratio (at 60° C., 300 cycles) |
|---|---|---|---|---|---|
| Example 2 | $LiMn_2O_4$/$LiVOPO_4$ | 233° C. | 100 | 109 | 49% |
| Comparative Example 2 | $LiMn_2O_4$ | 231° C. | 100 | 108 | 60% |

Example 1 was superior to Comparative Examples 1, 3, and 4 in terms of thermal stability and discharge energy. Example 2 improved the capacity maintenance ratio at a high temperature without losing properties of $LiMn_2O_4$ having a high thermal stability.

What is claimed is:
1. A positive active material comprising:
a core particle containing $LiCo_{(1-x)}M_xO_2$; and
a coating part covering at least part of a surface of the core particle, wherein:

the coating part contains $LiV_{(1-a)}M_aOPO_4$,

M in the $LiCo_{(1-x)}M_xO_2$ is at least one element selected from the group consisting of Al, Mg, Ti, Cr, Mn, Fe, Co, Ni, Cu, and Zn, $0 \leq x \leq 0.95$, M in the $LiV_{(1-a)}M_aOPO_4$ may be at least one element selected from the group consisting of Ti, Ni, Co, Mn, Fe, Zr, Cu, Zn, and Yb, and $0 \leq a \leq 0.05$.

2. The positive active material according to claim 1, wherein the coating part has a thickness of 50 nm to 1 μm.

3. A positive electrode comprising a current collector and an active material containing layer provided on the current collector, the active material containing layer comprising the positive active material of claim 1.

4. A lithium ion secondary battery comprising the positive electrode of claim 3.

5. A method of manufacturing a positive active material, the method comprising a step of causing at least part of a surface of a core particle containing $LiCo_{(1-x)}M_xO_2$ to support $LiV_{(1-a)}M_aOPO_4$, wherein:

M in the $LiCo_{(1-x)}M_xO_2$ is at least one element selected from the group consisting of Al, Mg, Ti, Cr, Mn, Fe, Co, Ni, Cu, and Zn, $0 \leq x \leq 0.95$, M in the $LiV_{(1-a)}M_aOPO_4$ may be at least one element selected from the group consisting of Ti, Ni, Co, Mn, Fe, Zr, Cu, Zn, and Yb, and $0 \leq a \leq 0.05$.

6. The method of manufacturing a positive active material according to claim 5, wherein the core particle and an $LiV_{(1-a)}M_aOPO_4$ particle are mixed in a fluidized bed.

7. The method of manufacturing a positive active material according to claim 5, further comprising mixing a solution containing a precursor of $LiV_{(1-a)}M_aOPO_4$ and the core particle and then synthesizing $LiVOPO_4$ in the solution.

* * * * *